United States Patent
Takagi et al.

(10) Patent No.: US 7,139,410 B2
(45) Date of Patent: Nov. 21, 2006

(54) APPARATUS FOR PROTECTING OCCUPANT IN VEHICLE

(75) Inventors: Akira Takagi, Nagoya (JP); Masayuki Imanishi, Okazaki (JP); Tomoyuki Goto, Anjo (JP); Hironori Sato, Nishio (JP)

(73) Assignees: Denso Corporation, Kariya (JP); Nippon Soken, Inc., Nishio (JP)

( * ) Notice: Subject to any disclaimer, the term of this patent is extended or adjusted under 35 U.S.C. 154(b) by 615 days.

(21) Appl. No.: 10/241,548

(22) Filed: Sep. 12, 2002

(65) Prior Publication Data

US 2003/0081814 A1 May 1, 2003

(30) Foreign Application Priority Data

Oct. 30, 2001 (JP) ............................. 2001-332449

(51) Int. Cl.
*G06K 9/00* (2006.01)
(52) U.S. Cl. ............... 382/103; 382/104; 382/106; 382/130; 382/284; 382/291; 382/294; 348/42; 348/47; 348/94; 348/152; 348/584
(58) Field of Classification Search ........ 382/103–109, 382/130, 174, 216, 284, 291, 294; 348/47–48, 348/42, 55, 94–95, 152–155, 584
See application file for complete search history.

(56) References Cited

U.S. PATENT DOCUMENTS

| | | | |
|---|---|---|---|
| 4,625,329 A | | 11/1986 | Ishikawa et al. |
| 6,125,198 A | * | 9/2000 | Onda ........................ 382/154 |
| 6,272,411 B1 | * | 8/2001 | Corrado et al. .............. 701/45 |
| 6,301,370 B1 | * | 10/2001 | Steffens et al. ............. 382/103 |
| 6,324,453 B1 | * | 11/2001 | Breed et al. ................. 701/45 |
| 6,618,491 B1 | * | 9/2003 | Abe ............................ 382/107 |
| 6,757,009 B1 | | 6/2004 | Simon et al. |
| 6,925,193 B1 | * | 8/2005 | Farmer ........................ 382/103 |
| 2002/0154791 A1 | * | 10/2002 | Onuma et al. .............. 382/103 |

FOREIGN PATENT DOCUMENTS

| | | |
|---|---|---|
| EP | 885782 | 12/1998 |
| JP | 60-152904 | 8/1985 |
| JP | 10-315906 | 12/1998 |

(Continued)

OTHER PUBLICATIONS

Office Action and its translation from Japanese Patent Office dated Aug. 15, 2005.

*Primary Examiner*—Samir Ahmed
*Assistant Examiner*—Manav Seth
(74) *Attorney, Agent, or Firm*—Posz Law Group, PLC

(57) ABSTRACT

An apparatus for protecting an occupant in a vehicle includes a pair of image sensors for taking images of an area on a seat in the vehicle. Transverse-direction shifts between corresponding portions of the images are calculated. Longitudinal-direction positions of objects whose images are in the portions of the images taken by the image sensors are measured in response to the calculated transverse-direction shifts. A longitudinal-direction position of an occupant on the seat is decided in response to the measured longitudinal-direction positions of the objects. Occupant protecting operation at a time of occurrence of a collision of the vehicle is changed in response to the decided longitudinal-direction position of the occupant. From the measured longitudinal-direction positions of the objects, one corresponding to a highest position with respect to the vehicle and being in front of the seat is selected as a longitudinal-direction position of a head of the occupant.

3 Claims, 6 Drawing Sheets

FOREIGN PATENT DOCUMENTS

| | | |
|---|---|---|
| JP | 11-15980 | 1/1999 |
| JP | A-H11-015980 | 1/1999 |
| JP | 11-43009 | 2/1999 |
| JP | 2001-116841 | 4/2001 |

\* cited by examiner

APPARATUS FOR PROTECTING OCCUPANT IN VEHICLE

BACKGROUND OF THE INVENTION

1. Field of the Invention

This invention generally relates to an apparatus for protecting an occupant in a vehicle such as an automotive vehicle. This invention particularly relates to a vehicular occupant protecting apparatus including image taking devices such as cameras or area image sensors.

2. Description of the Related Art

A known apparatus for protecting an occupant in a vehicle includes a pair of area image sensors located near a vehicle windshield and facing an area on a vehicle seat. The area image sensors are spaced at a prescribed interval along the widthwise direction (the transverse direction) of the vehicle. The area image sensors take images of the area on the vehicle seat, and output signals representing the taken images. In the known apparatus, the image-representing signals are processed to detect the positions of portions of an occupant on the seat. The detected positions are defined along the lengthwise direction (the longitudinal direction) of the vehicle. The mode of the control of deployment of an air bag is changed in response to the detected positions of the portions of the occupant.

In the known apparatus, shifts between corresponding portions of the images taken by the area image sensors are detected, and the positions of portions of an occupant are measured from the detected shifts on a triangulation basis. In the known apparatus, the triangulation-based detection of the positions of portions of an occupant includes complicated image-signal processing which causes a longer signal processing time. The longer signal processing time is a factor obstructive to the quick control of deployment of the air bag.

European patent application publication number EP 0885782 A1 which corresponds to Japanese patent application publication number 11-15980 discloses an apparatus for detecting the presence of an occupant in a motor vehicle. The apparatus in European application EP 0885782 A1 includes a pair of cameras for producing first and second images of a passenger area. A distance processor determines distances that a plurality of features in the first and second images are from the cameras based on the amount that each feature is shifted between the first and second images. An analyzer processes the distances and determines a size of an object on the seat. Additional analysis of the distances also may determine movement of the object and the rate of that movement. The distance information also can be used to recognize predefined patterns in the images and thus identify the object. A mechanism utilizes the determined object characteristics in controlling deployment of an air bag.

U.S. Pat. No. 4,625,329 which corresponds to Japanese patent application publication number 60-152904 discloses an image analyzer for analyzing the position of a vehicle driver in a three-dimensional coordinate system. The analyzer comprises a light emitting element for emitting an infrared light beam to the driver's face portion, and an image detector arranged to receive reflected infrared light and generate an optical image of the driver's face portion. A microcomputer includes a memory for storing an electronic image corresponding to the optical image.

The microcomputer processes the stored image to determine the position of a facial feature, such as an eye, in a three-dimensional coordinate system. The position indicating data are utilized in a driver assistance system.

Japanese patent application publication number 11-43009 discloses that an ultrasonic-wave transmitter/receiver measures the distance to an occupant in a vehicle, and the measured distance is utilized in determining the position of the occupant relative to an air bag. Deployment of the air bag is controlled in response to the determined relative position of the occupant. Japanese application 11-43009 also discloses that the position of an occupant in a vehicle can be detected by using two CCD arrays spaced from each other. Japanese application 11-43009 further discloses that a combination of a CCD array and a pattern recognition software takes an image of the head of an occupant in a vehicle and accurately detects the position of the head.

Japanese patent application publication number 10-315906 discloses an air-bag control system including an infrared sensor of a matrix type. The infrared sensor outputs data representing a thermo-based image. The image data are processed in response to a signal representative of a first threshold value to extract a portion of the image which corresponds to the body of an occupant in a vehicle. The image data are further processed in response to a signal representative of a second threshold value to extract a portion of the body image which corresponds to a face of the occupant. The position of the occupant's face is calculated from the positions of ones among the elements of the matrix of the infrared sensor which correspond to the occupant's face. An offset of the calculated position of the occupant's face from a reference position is computed. The offset is utilized in controlling the amount of air introduced into an air bag and also the direction of the gas introduction.

Japanese patent application publication number P2001-116841A discloses that an automotive vehicle is provided with a plurality of sensors for measuring the distances to a head of vehicle's occupant. The position of the head of the vehicle's occupant is determined in response to the measured distances.

SUMMARY OF THE INVENTION

It is an object of this invention to provide an improved apparatus for protecting an occupant in a vehicle.

A first aspect of this invention provides an apparatus for protecting an occupant in a vehicle having a seat. The apparatus comprises a pair of area image sensors spaced at a prescribed interval in a transverse direction of the vehicle and located in front of the seat for taking images of an area on the seat respectively; an occupant information calculating portion for calculating transverse-direction shifts between corresponding portions of the images taken by the area image sensors, for measuring longitudinal-direction positions of objects whose images are in the portions of the images taken by the area image sensors in response to the calculated transverse-direction shifts according to triangulation, and for deciding a longitudinal-direction position of an occupant on the seat in response to the measured longitudinal-direction positions of the objects; and an occupant protecting portion for changing occupant protecting operation at a time of occurrence of a collision of the vehicle in response to the longitudinal-direction position of the occupant which is decided by the occupant information calculating portion; wherein the occupant information calculating portion comprises means for selecting, from the measured longitudinal-direction positions of the objects, one corresponding to a highest position with respect to the vehicle and being in front of the seat as a longitudinal-direction position of a head of the occupant.

A second aspect of this invention is based on the first aspect thereof, and provides an apparatus wherein the occupant information calculating portion comprises means for dividing the images taken by the area image sensors into blocks, for calculating transverse-direction shifts between corresponding blocks of the images taken by the area image sensors, for measuring longitudinal-direction positions of objects whose images are in the blocks of the images taken by the area image sensors in response to the calculated transverse-direction shifts according to triangulation, and for selecting, from the measured longitudinal-direction positions of the objects, one corresponding to a highest position with respect to the vehicle and being in front of the seat as the longitudinal-direction position of the head of the occupant.

A third aspect of this invention is based on the second aspect thereof, and provides an apparatus wherein the occupant information calculating portion comprises means for calculating a cumulative difference between corresponding blocks, in each pair, of the images taken by the area image sensors while shifting one of the corresponding blocks relative to the other on a unit by unit basis, means for detecting when the calculated cumulative difference minimizes, means for calculating a transverse-direction shift between the corresponding blocks which occurs when the calculated cumulative difference minimizes, and for measuring a longitudinal-direction position of an object whose images are in the corresponding blocks in response to the calculated transverse-direction shift according to triangulation.

A fourth aspect of this invention is based on the third aspect thereof, and provides an apparatus wherein the occupant information calculating portion comprises means for calculating a cumulative difference between prescribed corresponding blocks in a pair during a time interval after the area image sensors output signals representing the prescribed corresponding blocks and before the area image sensors complete outputting signals representing all the blocks.

A fifth aspect of this invention is based on the second aspect thereof, and provides an apparatus wherein the occupant information calculating portion comprises means for sequentially implementing the measurements of the longitudinal-direction positions of objects whose images are in the blocks of the images taken by the area image sensors in an order from a highest-position block toward a lowest-position block, means for deciding whether or not the measured longitudinal-direction position of each object is in front of the seat, and means for, when it is decided that the measured longitudinal-direction position of the object is in front of the seat, deciding the measured longitudinal-direction position of the object to be the longitudinal-direction position of the head of the occupant.

A sixth aspect of this invention provides an apparatus for protecting an occupant in a vehicle having a seat. The apparatus comprises a distance measurement device located in front of the seat for measuring a distance to an occupant on the seat; an occupant information calculating portion for calculating a longitudinal-direction position of the occupant from the distance measured by the distance measurement device; and an occupant protecting portion for changing occupant protecting operation at a time of occurrence of a collision of the vehicle in response to the longitudinal-direction position of the occupant which is calculated by the occupant information calculating portion; wherein the distance measurement device includes a plurality of ultrasonic distance measurement sensors for measuring distances to objects in blocks composing a measured area, and wherein the occupant information calculating portion comprises means for selecting, from the distances measured by the ultrasonic distance measurement sensors, one corresponding to a highest position with respect to the vehicle and being in front of the seat as an indication of a longitudinal-direction position of a head of the occupant.

DETAILED DESCRIPTION OF THE INVENTION

First Embodiment

Figure 1:
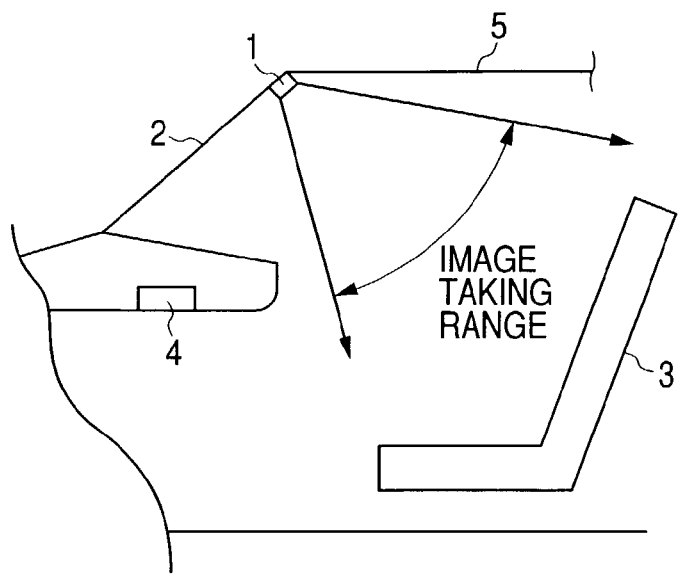
FIG. 1 is a diagrammatic side view of an apparatus for protecting an occupant in a vehicle according to a first embodiment of this invention.

FIG. 1 shows an apparatus for protecting an occupant in a vehicle (for example, an automotive vehicle) according to a first embodiment of this invention. The apparatus of FIG. 1 includes an occupant sensor 1 fixed to an upper portion of the windshield 2 of the vehicle. The occupant sensor 1 faces an area on an assistant driver's seat 3 of the vehicle. The occupant sensor 1 periodically takes an image of the area on the assistant driver's seat 3. The occupant sensor 1 outputs a signal representing the taken image.

It should be noted that the occupant sensor 1 may face an area on a main driver's seat of the vehicle and periodically take an image of that area.

A controller 4 disposed in an interior of an instrument panel assembly or a console panel assembly of the vehicle processes the output signal of the occupant sensor 1. The controller 4 controls inflation or deployment of an air bag in response to the processing results and also an output signal of a collision sensor. The body of the vehicle has a ceiling 5.

Figure 2:
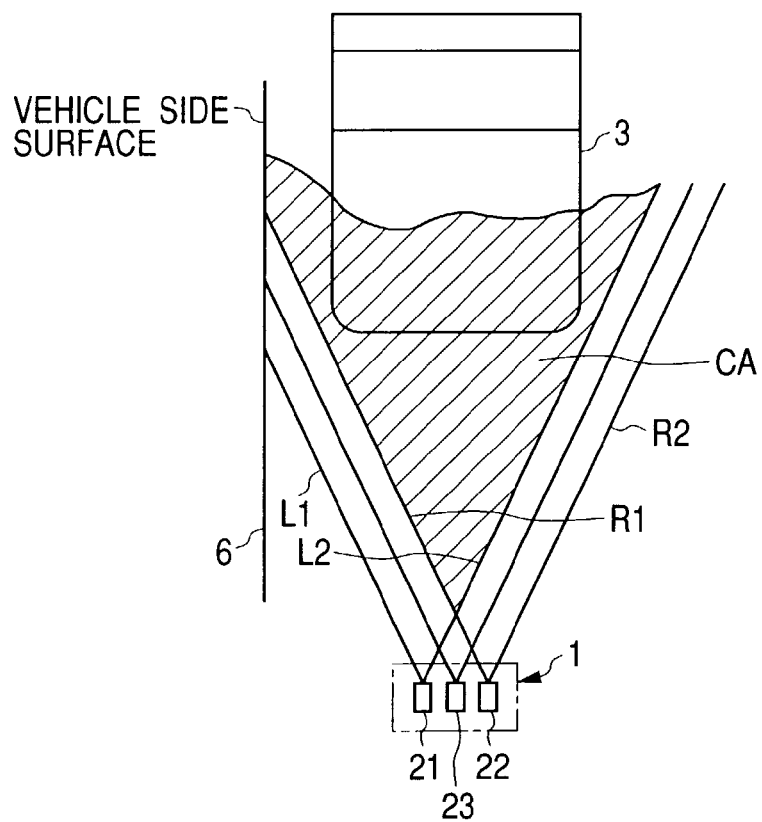
FIG. 2 is a diagrammatic plan view of an occupant sensor in FIG. 1, and an area whose image is taken by the occupant sensor.

With reference to FIGS. 1 and 2, the occupant sensor 1 includes a pair of infrared area image sensors 21 and 22, and an infrared LED 23. The infrared area image sensors 21 and 22 are fixed to a given part of the vehicle body which includes the upper portion of the windshield 2 and the front edge of the ceiling 5. The infrared image sensors 21 and 22 have a relatively wide field angle. The infrared area image sensors 21 and 22 periodically take images of a field including the assistant driver's seat 3. In other words, the infrared area image sensors 21 and 22 periodically take images of an area on the assistant driver's seat 3. The infrared area image sensors 21 and 22 output signals (data) representing the images which were taken. The infrared LED 23 is used as an auxiliary light source for night.

The infrared area image sensors 21 and 22 are spaced at a prescribed interval along the widthwise direction (the transverse direction) of the vehicle. The infrared area image sensors 21 and 22, and the infrared LED 23 have respective optical axes which are in planes vertical with respect to the vehicle body and parallel to the lengthwise direction (the longitudinal direction) of the vehicle. The optical axes of the infrared area image sensors 21 and 22, and the infrared LED 23 are in downward slant direction or downward slope directions as viewed therefrom.

In FIG. 2, the characters L1 and L2 denote the left-hand and right-hand edges of a field of view related to the infrared area image sensor 21, that is, the left-hand and right-hand edges of an area whose images are taken by the infrared area image sensor 21, respectively. The characters R1 and R2 denote the left-hand and right-hand edges of a field of view related to the infrared area image sensor 22, that is, the left-hand and right-hand edges of an area whose images are taken by the infrared area image sensor 22, respectively. There is a common area CA whose image is taken by both the infrared area image sensors 21 and 22. The common area CA has a portion on the assistant driver's seat 3. Images of portions of an inner side surface 6 of the vehicle body are taken by the infrared area image sensors 21 and 22. Portions of the image signals which represent the side-surface images are removed by image processing or optical-axis adjustment. For example, at night, the infrared LED 23 is activated to supply a sufficient amount of light to the area whose images are taken by the infrared area image sensors 21 and 22.

Each of the infrared area image sensors 21 and 22 has a two-dimensional matrix array of pixels, that is, "n" pixels in a horizontal direction by "m" pixels in a vertical direction, where "n" and "m" denote predetermined natural numbers respectively. The horizontal direction corresponds to the transverse direction or the widthwise direction of the vehicle. For every frame, the "n" by "m" pixels are sequentially scanned in an usual order on a line-by-line basis so that "m" signals corresponding to respective horizontal scanning lines are sequentially outputted from each of the infrared area image sensors 21 and 22. The "m" signals corresponding to the respective horizontal scanning lines represent a 1-frame image.

Figure 3:
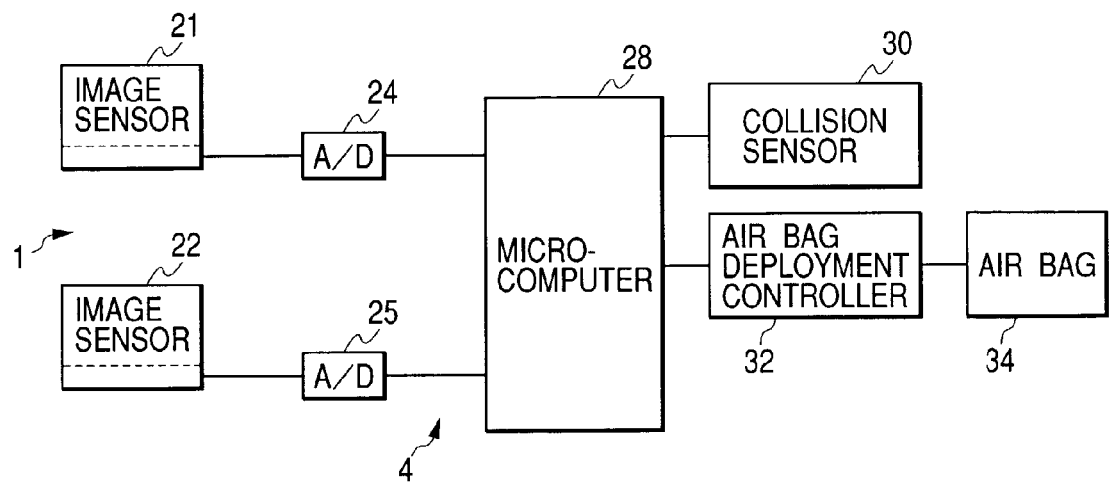
FIG. 3 is a block diagram of a controller in FIG. 1 and devices connected with the controller.

As shown in FIG. 3, the controller 4 includes analog-to-digital (A/D) converters 24 and 25, and a microcomputer 28. The A/D converter 24 is connected between the infrared area image sensor 21 and the microcomputer 28. The A/D converter 25 is connected between the infrared area image sensor 22 and the microcomputer 28.

Signals representing 1-frame images are synchronously outputted from the infrared area image sensors 21 and 22. Accordingly, for every frame, signals corresponding to equal horizontal scanning lines are outputted from the infrared area image sensors 21 and 22 at a same timing.

Figure 4:
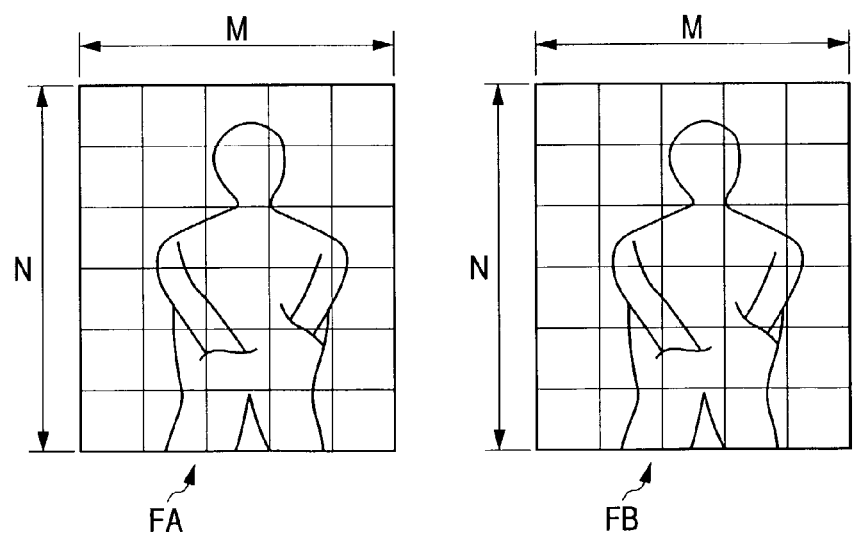
FIG. 4 is a diagram of an example of 1-frame images represented by output signals of infrared area image sensors in FIGS. 2 and 3.

As shown in FIG. 4, each of 1-frame images FA and FB represented by the output signals of the infrared area image sensors 21 and 22 is divided into N by M blocks being a matrix of N horizontal rows by M vertical columns, where N and M denote predetermined natural numbers respectively. For example, the natural numbers N and M are equal to 6 and 5, respectively. The uppermost row among the N rows corresponds to a part of a 1-frame image which is the highest with respect to the vehicle body while the lowermost row among the N rows corresponds to a part of the 1-frame image which is the lowest with respect to the vehicle body. Furthermore, the leftmost column among the M columns corresponds to a part of the 1-frame image which is the rightmost with respect to the vehicle body while the rightmost column among the M columns corresponds to a part of the 1-frame image which is the leftmost with respect to the vehicle body. Each of the N by M blocks is composed of 100 pixels being 10 pixels in a vertical direction by 10 pixels in a horizontal direction (10 rows by 10 columns of pixels).

The output signal of the infrared area image sensor 21 is analog. The A/D converter 24 changes the output signal of the infrared area image sensor 21 into a corresponding digital signal, and outputs the digital signal to the microcomputer 28. Specifically, the A/D converter 24 periodically samples the output signal of the infrared area image sensor 21 to get every 1-pixel-corresponding analog sample. The A/D converter 24 changes every 1-pixel-corresponding analog sample into a 1-pixel-corresponding digital sample having a predetermined number PN of bits. The A/D converter 24 outputs a sequence of 1-pixel-corresponding digital samples to the microcomputer 28 as a digital image signal.

The output signal of the infrared area image sensor 22 is analog. The A/D converter 25 changes the output signal of the infrared area image sensor 22 into a corresponding digital signal, and outputs the digital signal to the microcomputer 28. Specifically, the A/D converter 25 periodically samples the output signal of the infrared area image sensor 22 to get every 1-pixel-corresponding analog sample. The A/D converter 25 changes every 1-pixel-corresponding analog sample into a 1-pixel-corresponding digital sample having the predetermined number PN of bits. The A/D converter 25 outputs a sequence of 1-pixel-corresponding digital samples to the microcomputer 28 as a digital image signal.

The microcomputer 28 includes a combination of an input/output port, a CPU, a ROM, and a RAM. The microcomputer 28 operates in accordance with a control program stored in the ROM or the RAM. The microcomputer 28 may be replaced by a digital image processing circuit.

Figure 5:
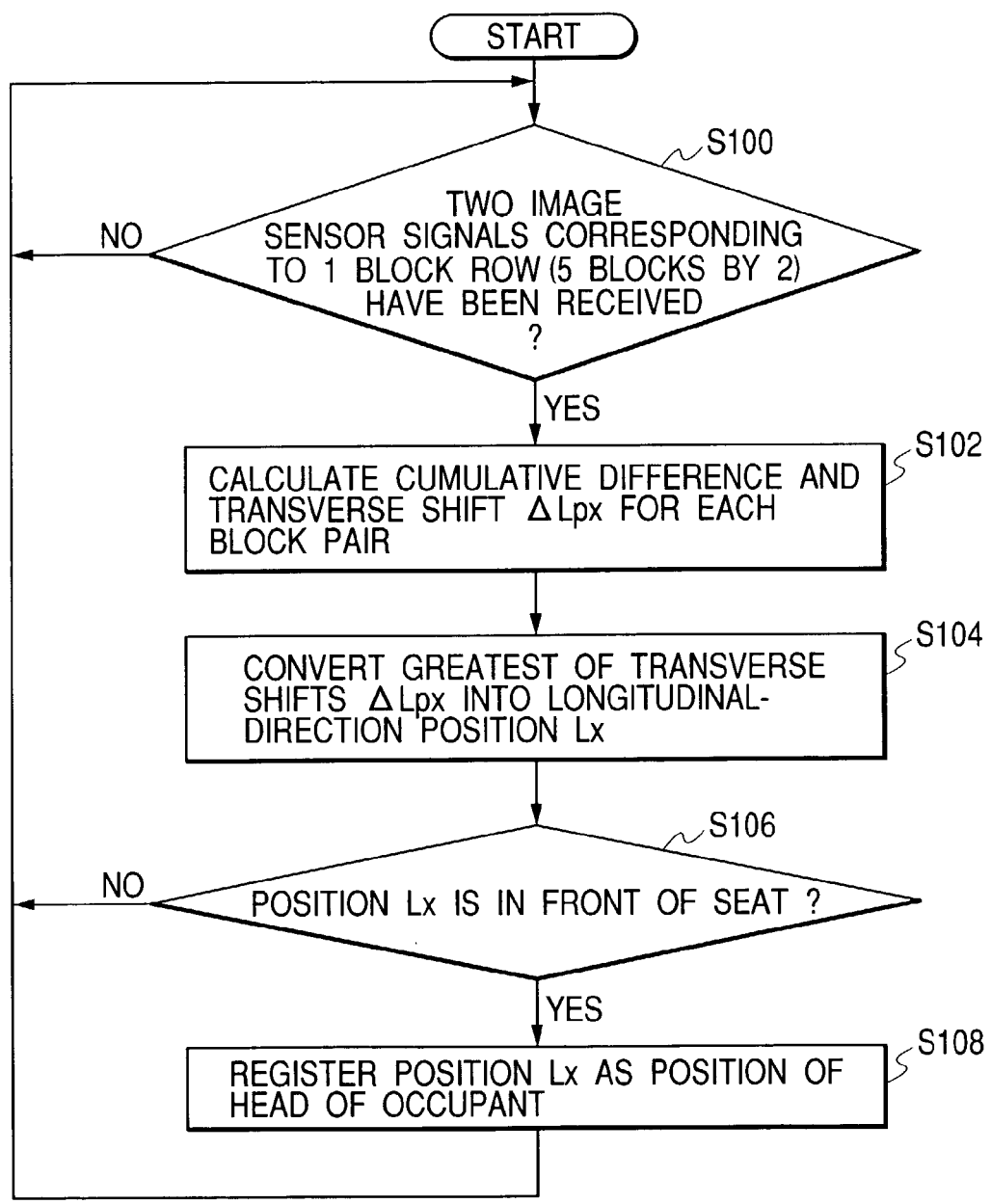
FIG. 5 is a flowchart of a segment of a control program for a microcomputer in FIG. 3.

FIG. 5 is a flowchart of a segment of the control program for the microcomputer 28 which relates to detection of the position of the head of an occupant in the vehicle. The detected position of the occupant's head is defined in the longitudinal direction (the lengthwise direction) of the vehicle.

With reference to FIG. 5, a first step S100 of the program segment determines whether or not the output signal (the pixel signal) of the A/D converter 24 which corresponds to M blocks (5 blocks) in the latest row, and also the output signal (the pixel signal) of the A/D converter 25 which corresponds to M blocks (5 blocks) in the same row have been received. When the output signals of the A/D converters 24 and 25 which each correspond to M blocks in the latest row have been received, the program advances from the step S100 to a step S102. Otherwise, the step S100 is repeated.

For every frame, 1-row-corresponding signals are sequentially outputted from the A/D converters 24 and 25 (the infrared area image sensors 21 and 22) in an order as follows. Firstly, signals each corresponding to M blocks in the uppermost row are outputted from the A/D converters 24 and 25. Secondly, signals each corresponding to M blocks in the second uppermost row are outputted. Thirdly, signals each corresponding to M blocks in the third uppermost row are outputted. Signals corresponding to the fourth uppermost row and later rows are sequentially outputted. Finally, signals each corresponding to M blocks in the lowermost row are outputted.

The step S102 makes M pairs of blocks at equal two-dimensional positions in the latest rows. Each of the M pairs has two equal-position blocks represented by the output signals of the A/D converters 24 and 25 (the infrared area image sensors 21 and 22) respectively. The step S102 implements distance measurement of a cumulative difference processing type for each of the M block pairs. During the distance measurement for each block pair, a difference processing image is derived from partial images in blocks of the pair according to a procedure indicated below.

Each of the partial images (the block images) in the blocks making the pair is represented by 1-pixel-corresponding signals representing 10 rows by 10 columns of pixels. Firstly, 1-pixel corresponding signals representing one of the block images and 1-pixel-corresponding signals representing the other block image are into pairs of ones at equal addresses relative to the blocks. A difference (for example, a luminance difference) between 1-pixel-corresponding signals in each pair is calculated. The calculated differences for all the pairs are integrated to get a cumulative-difference-indicating signal S.

Secondly, one of the block images is horizontally shifted relative to the other block image by a pitch of one pixel column. Here, "horizontally" corresponds to "transversely with respect to the vehicle". Then, a cumulative-difference-indicating signal Snew is generated similarly to the above-mentioned generation of the cumulative-difference-indicating signal S. The horizontal shift (the transverse shift) by a pitch of one pixel column and the generation of the cumulative-difference-indicating signal Snew are equivalent to the summation of the differences each between a set of 1-pixel-corresponding signals representing a K-th pixel column in one of the block images and a set of 1-pixel-corresponding signals representing a (K+1)-th pixel column in the other block image. Here, the (K+1)-th pixel column means a pixel column spaced rightward or leftward from the K-th pixel column at a horizontal interval of one pixel. After the horizontal shift by a pitch of one pixel column, the leftmost pixel column or the rightmost pixel column in one of the partial images is subjected to difference calculation with the rightmost pixel column or the leftmost pixel column in one of next partial images.

Thirdly, the cumulative-difference-indicating signals S and Snew are compared with each other. When the value of the cumulative-difference-indicating signal Snew is equal to or greater than the value of the cumulative-difference-indicating signal S, the cumulative-difference-indicating signal S remains unchanged. On the other hand, when the value of the cumulative-difference-indicating signal Snew is smaller than the value of the cumulative-difference-indicating signal S, the cumulative-difference-indicating signal S is updated to the cumulative-difference-indicating signal Snew. In this case, data representing the horizontal shift quantity (corresponding to one pixel) $\Delta Lpx$ are generated. The horizontal shift quantity data are stored in the RAM within the microcomputer 28. The horizontal shift quantity $\Delta Lpx$ is also referred to as the transverse shift quantity $\Delta Lpx$.

Subsequently, one of the block images is horizontally shifted relative to the other block image by a pitch of two pixel columns. Then, a cumulative-difference-indicating signal Snew is generated similarly to the above-mentioned generation of the cumulative-difference-indicating signal Snew. The horizontal shift by a pitch of two pixel columns and the generation of the cumulative-difference-indicating signal Snew are equivalent to the summation of the differences each between a set of 1-pixel-corresponding signals representing a K-th pixel column in one of the block images and a set of 1-pixel-corresponding signals representing a (K+2)-th pixel column in the other block image. Here, the (K+2)-th pixel column means a pixel column spaced rightward or leftward from the K-th pixel column at a horizontal interval of two pixels. After the horizontal shift by a pitch of two pixel columns, the two leftmost pixel columns or the two rightmost pixel columns in one of the partial images are subjected to difference calculation with the two rightmost pixel columns or the two leftmost pixel columns in one of next partial images.

Then, the cumulative-difference-indicating signals S and Snew are compared with each other. When the value of the cumulative-difference-indicating signal Snew is equal to or greater than the value of the cumulative-difference-indicating signal S, the cumulative-difference-indicating signal S remains unchanged. On the other hand, when the value of the cumulative-difference-indicating signal Snew is smaller than the value of the cumulative-difference-indicating signal S, the cumulative-difference-indicating signal S is updated to the cumulative-difference-indicating signal Snew. In this case, data representing the horizontal shift quantity (corresponding to two pixels) $\Delta Lpx$ are generated. The horizontal shift quantity data are stored in the RAM within the microcomputer 28. When old horizontal shift quantity data exist in the RAM, the new horizontal shift quantity data are written over the old data.

The above-mentioned processing is repetitively executed for horizontal shifts up to a pitch of a given number of pixel columns, and the horizontal shift quantity $\Delta Lpx$ which corresponds to the smallest cumulative difference is finally decided. The data representing the finally-decided horizontal shift quantity $\Delta Lpx$ are in the RAM within the microcomputer 28.

In this way, the horizontal shift quantity $\Delta Lpx$ is decided for each of the M block pairs. Thus, the horizontal shift quantities $\Delta Lpx(1)$, $\Delta Lpx(2)$, . . . , and $\Delta Lpx(M)$ are decided for the M block pairs, respectively.

A step S104 following the step S102 selects the greatest one $\Delta Lpxmax$ from the horizontal shift quantities $\Delta Lpx(1)$, $\Delta Lpx(2)$, . . . , and $\Delta Lpx(M)$. The step S104 places the greatest horizontal shift quantity $\Delta Lpxmax$ and predetermined optical parameters into a given equation, and thereby calculates the shortest longitudinal-direction distance Lx to an object from the infrared area image sensors 21 and 22 (from lenses of the infrared area image sensors 21 and 22). It should be noted that the greatest horizontal shift quantity $\Delta Lpxmax$ increases as an object is closer to the lenses of the infrared area image sensors 21 and 22.

A step S106 subsequent to the step S104 determines whether or not the object position corresponding to the shortest longitudinal-direction distance Lx is in front of a prestored or predecided longitudinal-direction position of the assistant driver's seat 3. When the object position is in front of the prestored longitudinal-direction position of the assistant driver's seat 3, the program advances from the step S106 to a step S108. Otherwise, the program returns to the step S100. It should be noted that data representing the longitudinal-direction position of the assistant driver's seat 3 for each of the N rows are prepared in the ROM or the RAM within the microcomputer 28.

The step S108 gets the two-dimensional coordinates of the blocks in the pair which corresponds to the shortest longitudinal-direction distance Lx. In other words, the step S108 gets the position of the blocks in the pair relative to the block matrix (the block array) wherein the block pair corresponds to the shortest longitudinal-direction distance Lx. The step S108 stores data representative of the shortest longitudinal-direction distance Lx, and data representative of the two-dimensional coordinates of the blocks in the pair which corresponds to the shortest longitudinal-direction distance Lx into registers formed by the RAM. The shortest longitudinal-direction distance Lx is handled as an indication of the longitudinal-direction position of a portion of an occupant in the vehicle. The two-dimensional coordinates of the blocks in the pair which corresponds to the shortest longitudinal-direction distance Lx are handled as an indication of the two-dimensional position of the portion of the occupant. After the step S108, the program returns to the step S100.

Preferably, the step S108 decides whether or not 1-row-corresponding signals relating to the lowermost row have been processed. When 1-row-corresponding signals relating to the lowermost row have been processed, the step S108 accesses the data in the registers which represent the shortest longitudinal-direction distances Lx and the two-dimensional coordinates of the blocks in the pairs which correspond to the shortest longitudinal-direction distances Lx. The step S108 refers to the two-dimensional coordinates of the blocks in the pairs which correspond to the shortest longitudinal-direction distances Lx, and selects therefrom the block pair at the highest position or the greatest height relative to the block array (the block matrix). The step S108 concludes the selected block pair to be in correspondence with the head of an occupant in a vehicle. Therefore, the shortest longitudinal-direction distance Lx corresponding to the selected block pair is handled as an indication of the longitudinal-direction position of the head of an occupant in the vehicle. The two-dimensional coordinates of the blocks in the selected pair are handled as an indication of the two-dimensional position of the occupant's head. When 1-row-corresponding signals relating to the lowermost row have not yet been processed, the program exits from the step S108 and then returns to the step S100.

According to another example, the step S108 functions as follows. When 1-row-corresponding signals relating to the lowermost row have been processed, the step S108 accesses the data in the registers which represent the shortest longitudinal-direction distances Lx and the two-dimensional coordinates of the blocks in the pairs which correspond to the shortest longitudinal-direction distances Lx. The step S108 refers to the two-dimensional coordinates of the blocks in the pairs which correspond to the shortest longitudinal-direction distances Lx, and thereby calculates the configuration of the blocks in the pairs. The step S108 collates the calculated configuration with a predetermined reference human-body pattern. In response to the result of the collation, the step S108 selects one from the block pairs as being in correspondence with the head of an occupant in a vehicle. Therefore, the shortest longitudinal-direction distance Lx corresponding to the selected block pair is handled as an indication of the longitudinal-direction position of the head of an occupant in the vehicle. The two-dimensional coordinates of the blocks in the selected pair are handled as an indication of the two-dimensional position of the occupant's head. In this case, it is possible to prevent a raised hand of an occupant from being recognized as the head of the occupant. When 1-row-corresponding signals relating to the lowermost row have not yet been processed, the program exits from the step S108 and then returns to the step S100.

It should be noted that the horizontal shift quantities $\Delta Lpx$ are reset each time the processing of a pair of 1-frame images is completed.

As shown in FIG. 3, a collision sensor 30 is connected with the microcomputer 28. The collision sensor 30 informs the microcomputer 28 whether or not a collision of the vehicle occurs. The microcomputer 28 is connected with an air-bag deployment controller (an air-bag inflation controller) 32. The air-bag deployment controller 32 is connected with an air bag 34. In the event that a collision of the vehicle occurs, the microcomputer 28 accesses the data in the registers which represent the longitudinal-direction position of the occupant's head, and controls the air-bag deployment controller 32 and thereby adjusts the deployment (the inflation) of the air bag 34 according to the longitudinal-direction position of the occupant's head.

Specifically, the ROM or the RAM within the microcomputer 28 stores data representing a table of air-bag deployment control modes assigned to different occupant's-head positions respectively. In the event that a collision of the vehicle occurs, the microcomputer 28 accesses the data in the registers which represent the longitudinal-direction position of the occupant's head, and selects one from the air-bag deployment control modes in the table in response to the longitudinal-direction position of the occupant's head. Then, the microcomputer 28 controls the air-bag deployment controller 32 to implement the deployment (the inflation) of the air bag 34 in accordance with the selected air-bag deployment control mode.

As understood from the previous description, when the output signals of the A/D converters 24 and 25 which each correspond to M blocks in the latest row have been received, the block-pair by block-pair processing by the step S102 is started. Block signals are sequentially processed in the order from block signals corresponding to the uppermost row to block signals corresponding to the lowermost row. Therefore, a reduced memory capacity suffices.

As previously mentioned, in the step S102, a difference (for example, a luminance difference) between 1-pixel-corresponding signals in each pair is calculated. The calculated differences for all the pairs are integrated to get a cumulative-difference-indicating signal S for one block pair. Specifically, a difference between 1-pixel-corresponding signals in each pair is positive or negative. The absolute value of a difference between 1-pixel-corresponding signals in each pair is calculated. The calculated absolute values of the differences for all the pairs are added to get a cumulative-difference-indicating signal S for one block pair.

In the step S102, a cumulative-difference-indicating signal S is generated for each of different horizontal shift quantities between two blocks making a pair. The horizontal shift quantity $\Delta Lpx$ which corresponds to the smallest of the cumulative differences is finally decided. The smallest cumulative difference means that the two-dimensional image patterns represented by the two block signals match each other to the highest degree. Accordingly, the finally-decided horizontal shift quantity $\Delta Lpx$ corresponds to a parallax between the two blocks (that is, the transverse-direction shift quantity between two images on the infrared area image sensors 21 and 22). The parallax increases as an object is closer to the lenses of the infrared area image sensors 21 and 22. For the respective block pairs, the longitudinal-direction object positions are calculated from the parallaxes. One of the longitudinal-direction object positions which is in front of the position of the assistant driver's seat 3, and which corresponds to the block pair at the highest position or the greatest height relative to the block array (the block matrix) is finally decided as the longitudinal-direction position of the head of an occupant in the vehicle.

As previously mentioned, each of two images (two-dimensional images) taken by the infrared area image sensors 21 and 22 is divided into a matrix array of blocks. The blocks of one of the two images and the blocks of the other image are made into pairs. Each pair has a block of one of the two images at a two-dimensional position and a block of the other image at the same two-dimensional position. Furthermore, 1-pixel-corresponding signals representing one of the two images and 1-pixel-corresponding signals representing the other image are made into pairs. Each pair has a 1-pixel-corresponding signal representing a pixel of one of the two images and a 1-pixel-corresponding signal representing the same-position pixel of the other image. For each of the block pairs, the absolute values of the differences between the same-pair 1-pixel-corresponding signals are calculated, and the calculated absolute values are integrated to generate a cumulative-difference-indicating signal. The generation of a cumulative-difference-indicating signal is repetitively executed while one of the block images is horizontally (transversely) shifted relative to the other block image on a unit-by-unit basis. The transverse shift quantity (the horizontal shift quantity) which corresponds to the smallest of the cumulative-difference-indicating signals is finally decided. The finally-decided transverse shift quantity corresponds to a parallax between the two images. The distance to an object whose images are in the blocks making the pair is geometrically calculated from the parallax.

Second Embodiment

A second embodiment of this invention is similar to the first embodiment thereof except for design changes indicated hereafter.

Figure 6:
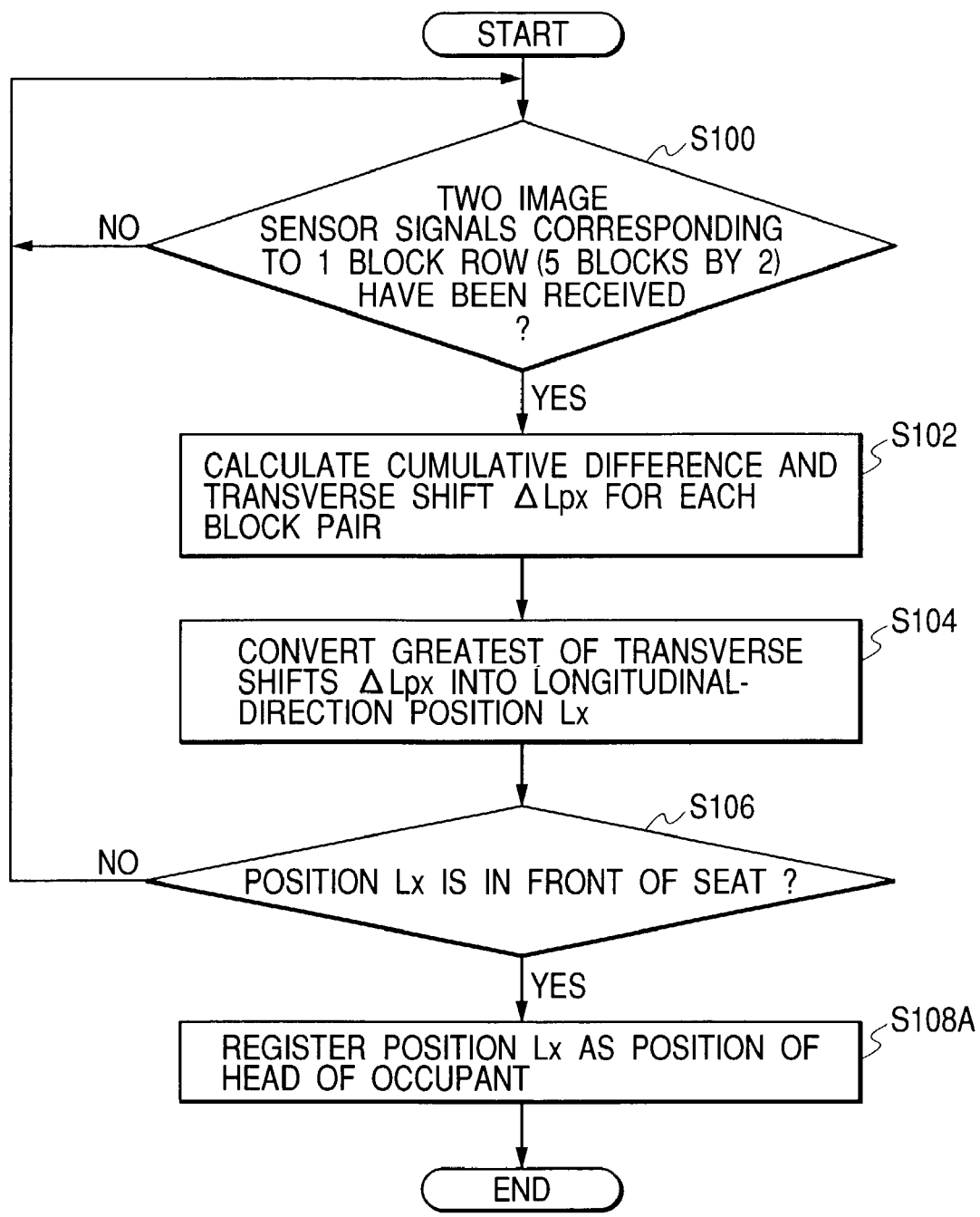
FIG. 6 is a flowchart of a segment of a control program for a microcomputer in a second embodiment of this invention.

FIG. 6 is a flowchart of a segment of the control program for the microcomputer 28 in the second embodiment of this invention. The program segment in FIG. 6 relates to detection of the position of the head of an occupant in the vehicle. The program segment in FIG. 6 is executed for every frame related to the output signals of the A/D converters 24 and 25. The program segment in FIG. 6 has steps S100, S102, S104, and S106 which are similar to those in FIG. 5.

With reference to FIG. 6, the step S106 determines whether or not the object position corresponding to the shortest longitudinal-direction distance Lx is in front of a prestored or predecided longitudinal-direction position of the assistant driver's seat 3. When the object position is in front of the prestored longitudinal-direction position of the assistant driver's seat 3, the program advances from the step S106 to a step S108A. Otherwise, the program returns to the step S100.

The step S108A gets the two-dimensional coordinates of the blocks in the pair which corresponds to the shortest longitudinal-direction distance Lx. In other words, the step S108A gets the position of the blocks in the pair relative to the block matrix (the block array) wherein the block pair corresponds to the shortest longitudinal-direction distance Lx. The step S108A stores data representative of the shortest longitudinal-direction distance Lx, and data representative of the two-dimensional coordinates of the blocks in the pair which corresponds to the shortest longitudinal-direction distance Lx into registers formed by the RAM. The shortest longitudinal-direction distance Lx is handled as an indication of the longitudinal-direction position of the head of an occupant in the vehicle. The two-dimensional coordinates of the blocks in the pair which corresponds to the shortest longitudinal-direction distance Lx are handled as an indication of the two-dimensional position of the occupant's head. After the step S108A, the current execution cycle of the program segment ends.

The longitudinal-direction position of the head of an occupant in the vehicle can be detected before the outputting of 1-frame-corresponding signals from the A/D converters 24 and 25 (the infrared area image sensors 21 and 22) is completed. For every frame, once the longitudinal-direction position of the head of an occupant is detected, the further processing is prevented from being executed. Therefore, the circuit structure can be simplified, and the processing at a high speed can be provided.

Third Embodiment

A third embodiment of this invention is similar to the first embodiment thereof except for design changes indicated hereafter.

According to the third embodiment of this invention, two signals corresponding to equal-position horizontal scanning lines are synchronously outputted from the infrared area image sensors 21 and 22. The 1-scanning-line-corresponding signals outputted from the infrared area image sensors 21 and 22 are transmitted to the microcomputer 28 via the A/D converters 24 and 25. The microcomputer 28 is designed to implement the processing indicated below. Portions of two synchronized 1-scanning-line-corresponding signals which represent contours exhibit great changes in luminance. Such great-luminance-change portions (contour-representing portions) are extracted from the two 1-scanning-line-corresponding signals. Ones among the extracted great-luminance-change portions which meet prescribed conditions are made into pairs. Specifically, one great-luminance-change portion originating from one of the two 1-scanning-line-corresponding signals and one great-luminance-change portion originating from the other 1-scanning-line-corresponding signal which are close in position to each other, and which are approximately the same in luminance change pattern are made into a pair corresponding to a same object (a same contour). Horizontal-direction distances (transverse-direction distances) between great-luminance-change portions in respective pairs on two-dimensional images are computed, and the longitudinal-direction distances to objects (contours) from the lenses of the infrared area image sensors 21 and 22 are calculated based on the computed horizontal-direction distances according to triangulation. The longitudinal-direction positions of the objects (the contours) are determined in accordance with the calculated longitudinal-direction distances thereto. One of the longitudinal-direction object positions which is in front of the position of the assistant driver's seat 3, and which corresponds to the highest position or the greatest height relative to the two-dimensional images is finally decided as the longitudinal-direction position of the head of an occupant in the vehicle. It should be noted that the position of the assistant driver's seat 3 is predetermined or currently given.

A more detailed description of the third embodiment of this invention is given blow. Each of frames represented by the output signals of the infrared area image sensors 21 and 22 is divided into Nmax blocks corresponding to horizontal scanning lines respectively. Serial ID numbers "1", "2", . . . , and "Nmax" are sequentially given to 1-scanning-line-corresponding signals covering a frame, respectively. An ID number of "1" is given to signals representing the uppermost horizontal scanning line in a frame. An ID number of "Nmax" is given to signals representing the lowermost horizontal scanning line in a frame.

Firstly, a decision is made as to whether or not a flag N denoting a scanning-line ID number reaches the value Nmax. When the flag N reaches the value Nmax, the flag N is reset to "1". Otherwise, the flag N is incremented by "1".

Secondly, great-luminance-change portions (contour-representing portions) are extracted from two 1-scanning-line-corresponding signals having ID numbers equal to the flag N and being outputted by the infrared area image sensors 21 and 22. Ones among the extracted great-luminance-change portions which meet prescribed conditions are made into pairs. Specifically, one great-luminance-change portion originating from one of the two 1-scanning-line-corresponding signals and one great-luminance-change portion originating from the other 1-scanning-line-corresponding signal which are close in position to each other, and which are approximately the same in luminance change pattern are made into a pair corresponding to a same object (a same contour).

Thirdly, regarding the two 1-scanning-line-corresponding signals having ID numbers equal to the flag N, horizontal-direction shifts (transverse-direction shifts) between great-luminance-change portions in respective pairs on two-dimensional images are computed. Data representing the computed horizontal-direction shifts are stored.

Subsequently, a decision is made as to whether or not the horizontal-direction shifts regarding the two 1-scanning-line-corresponding signals having ID numbers equal to the flag N, the horizontal-direction shifts regarding the two 1-scanning-line-corresponding signals having ID numbers equal to the value N−1, and the horizontal-direction shifts regarding the two 1-scanning-line-corresponding signals having ID numbers equal to the value N−2 are similar to each other and relate to horizontally-close coordinates. When the result of the decision is positive, the horizontal-direction shifts regarding the two 1-scanning-line-corresponding signals having ID numbers equal to the flag N are concluded to be different from noise so that they are left as being effective. On the other hand, when the result of the decision is negative, the horizontal-direction shifts regarding the two 1-scanning-line-corresponding signals having ID numbers equal to the flag N are concluded to be noise so that they are canceled or removed.

Thereafter, regarding the two 1-scanning-line-corresponding signals having ID numbers equal to the flag N, the greatest one is selected from the horizontal-direction shifts. The selected horizontal-direction shift is used as a final horizontal-direction shift. It should be noted that a horizontal-direction shift increases as an object is closer to the infrared area image sensors 21 and 22.

Subsequently, regarding the two 1-scanning-line-corresponding signals having ID numbers equal to the flag N, a decision is made as to whether or not the final horizontal-direction shift is greater than a predetermined horizontal-direction shift corresponding to the assistant driver's seat 3, that is, whether or not a detected object (a detected contour) is in front of the assistant driver's seat 3. When the final horizontal-direction shift is greater than the predetermined horizontal-direction shift, that is, when the detected object (the detected contour) is in front of the assistant driver's seat 3, the final horizontal-direction shift is converted into the longitudinal-direction distance to the detected object from the lenses of the infrared area image sensors 21 and 22 according to triangulation responsive to predetermined optical-system parameters. The longitudinal-direction distance to the detected object is decided as an indication of the longitudinal-direction position of the head of an occupant on the assistant driver's seat 3. The scanning-line ID number N (the flag N) is considered to be an indication of the height (the vertical position) of the occupant's head. Data representing the longitudinal-direction position of the occupant's head, and also data representing the height of the occupant's head are stored into registers formed by the RAM. In this way, the position of the occupant's head is decided for the current frame. Accordingly, the further processing for the current frame is omitted, and the flag N is reset to "1" so that a next frame is waited for. On the other hand, when the final horizontal-direction shift is not greater than the predetermined horizontal-direction shift, that is, when the detected object (the detected contour) is not in front of the assistant driver's seat 3, the processing advances to a next stage for two 1-scanning-line-corresponding signals having ID numbers equal to the value N+1.

Fourth Embodiment

Figure 7:
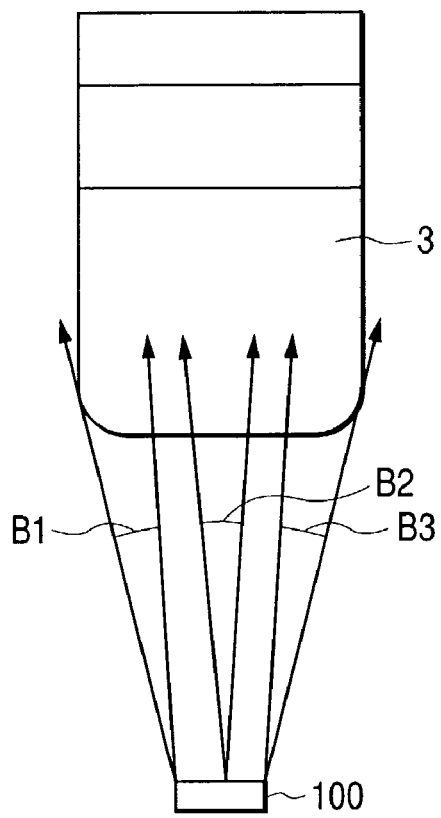
FIG. 7 is a diagrammatic plan view of a portion of an apparatus for protecting an occupant in a vehicle according to a fourth embodiment of this invention.

FIG. 7 shows an apparatus for protecting an occupant in a vehicle (for example, an automotive vehicle) according to a fourth embodiment of this invention. The apparatus of FIG. 7 is similar to the apparatus of FIG. 1 except for design changes indicated hereafter.

Figure 8:
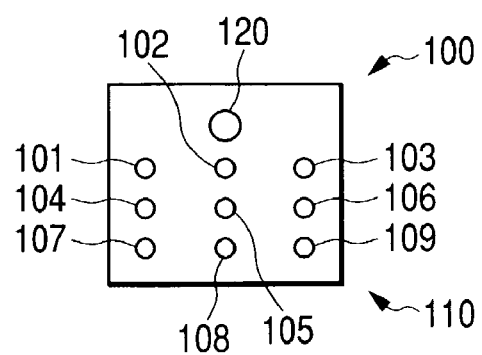
FIG. 8 is a front view of an occupant sensor in FIG. 7.

The apparatus of FIG. 7 includes an occupant sensor 100 instead of the occupant sensor 1 (see FIG. 1). As shown in FIG. 8, the occupant sensor 100 has an ultrasonic oscillator array 110 and an ultrasonic receiver 120. The ultrasonic oscillator array 110 is of a 3 by 3 matrix type, having ultrasonic oscillators 101–109 being three ultrasonic oscillators in a horizontal direction by three ultrasonic oscillators in a vertical direction. The horizontal direction corresponds to a transverse direction (a widthwise direction) of the vehicle. The ultrasonic receiver 120 is located immediately above the ultrasonic oscillator array 110.

Figure 9:
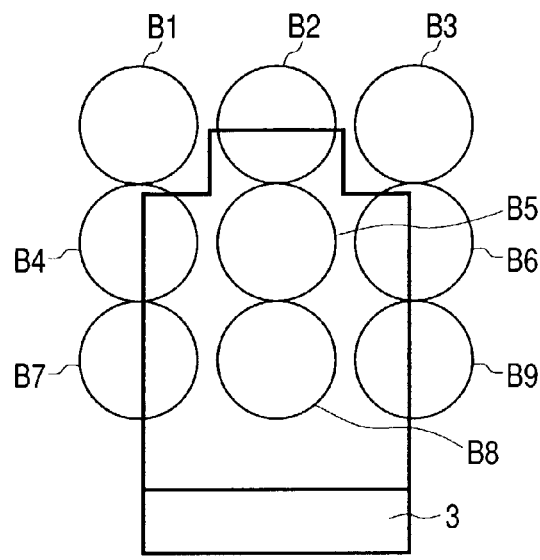
FIG. 9 is a diagram of circular regions covered by ultrasonic wave beams emitted from ultrasonic oscillators in FIG. 8.

With reference to FIGS. 7, 8, and 9, the ultrasonic oscillators 101–109 emit ultrasonic wave beams B1–B9 in predetermined directions, respectively. The ultrasonic wave beam B1 from the ultrasonic oscillator 101 covers a circular region rightward and upward of the assistant driver's seat 3 as viewed from the seat 3. The ultrasonic wave beam B2 from the ultrasonic oscillator 102 covers a circular region upward of a center of the assistant driver's seat 3 as viewed from the seat 3. The ultrasonic wave beam B3 from the ultrasonic oscillator 103 covers a circular region leftward and upward of the assistant driver's seat 3 as viewed from the seat 3. The ultrasonic wave beam B4 from the ultrasonic oscillator 104 covers a circular region containing a right-hand and height-direction-center portion of the assistant driver's seat 3 as viewed from the seat 3. The ultrasonic wave beam B5 from the ultrasonic oscillator 105 covers a circular region in a transverse-direction-center and height-direction-center portion of the assistant driver's seat 3 as viewed from the seat 3. The ultrasonic wave beam B6 from the ultrasonic oscillator 106 covers a circular region containing a left-hand and height-direction-center portion of the assistant driver's seat 3 as viewed from the seat 3. The ultrasonic wave beam B7 from the ultrasonic oscillator 107 covers a circular region rightward and downward of the assistant driver's seat 3 as viewed from the seat 3. The ultrasonic wave beam B8 from the ultrasonic oscillator 108 covers a circular region downward of a center of the assistant driver's seat 3 as viewed from the seat 3. The ultrasonic wave beam B9 from the ultrasonic oscillator 109 covers a circular region leftward and downward of the assistant driver's seat 3 as viewed from the seat 3.

Figure 10:
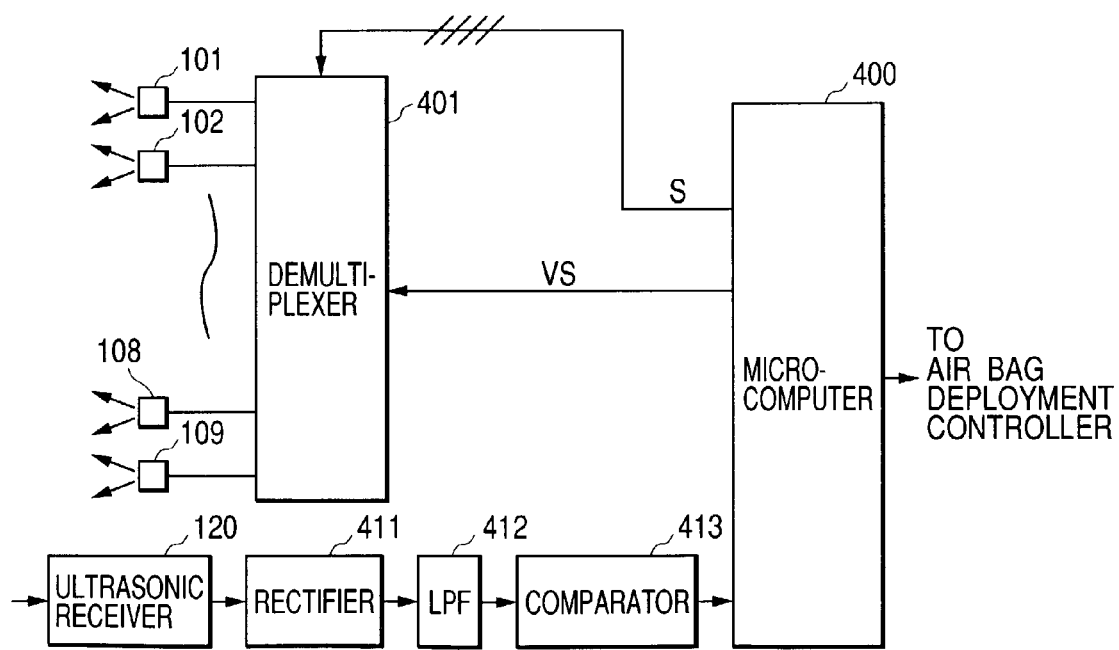
FIG. 10 is a block diagram of the ultrasonic oscillators, a microcomputer, and related devices in the fourth embodiment of this invention.

As shown in FIG. 10, the ultrasonic oscillators 101–109 are connected with a demultiplexer 401. The demultiplexer 401 is connected with a microcomputer 400. The microcomputer 400 replaces the microcomputer 28 (see FIG. 3). The ultrasonic receiver 120 is successively followed by a rectifier 411, a low pass filter 412, and a comparator 413. The comparator 413 is connected with the microcomputer 400.

The microcomputer 400 generates a drive voltage VS having a prescribed frequency. The microcomputer 400 outputs the drive voltage VS to the demultiplexer 401. The microcomputer 400 generates a selection signal S. The microcomputer 400 outputs the selection signal S to the demultiplexer 401. The demultiplexer 401 sequentially and cyclically distributes the drive voltage VS to the ultrasonic oscillators 101–109 in response to the selection signal S. The time interval during which the drive voltage VS continues to be applied to each of the ultrasonic oscillators 101–109 is equal to a predetermined value.

Each of the ultrasonic oscillators 101–109 emits an ultrasonic wave beam in a predetermined direction when receiving the drive voltage VS. The emitted ultrasonic wave beam at least partially changes to an echo ultrasonic wave beam when meeting an object. The echo ultrasonic wave beam partially reaches the ultrasonic receiver 120, being converted by the ultrasonic receiver 120 into a corresponding electric echo signal. The ultrasonic receiver 120 outputs a reception signal to the rectifier 411 which contains echo signals. The device 411 rectifies the output signal of the ultrasonic receiver 120, and outputs the resultant signal to the low pass filter 412. The low pass filter 412 smooths the output signal of the rectifier 411, and outputs the resultant signal to the comparator 413. The device 413 compares the output signal of the low pass filter 412 with a predetermined threshold voltage, thereby converting the output signal of the low pass filter 412 into a corresponding binary signal. The comparator 413 outputs the binary signal to the microcomputer 400. The microcomputer 400 measures the time interval T between the moment of the emission of each of the ultrasonic wave beams from the ultrasonic oscillators 101–109 and the moment of the occurrence of an echo-corresponding rising edge in the output signal of the comparator 413. The microcomputer 400 uses the measured time interval T in estimating the distance L to an object from the related one of the ultrasonic oscillators 101–109. The microcomputer 400 calculates the longitudinal-direction distance to the object from the estimated distance L and the angle θ between the longitudinal direction and the direction of the related emitted ultrasonic wave beam. Accordingly, the microcomputer 400 provides calculated longitudinal-direction distances to objects in the regions covered by the emitted ultrasonic wave beams B1–B9 respectively. The microcomputer 400 decides the longitudinal-direction position of the head of an occupant in the vehicle on the basis of the calculated longitudinal-direction distances to the objects. Specifically, the microcomputer 400 selects, from the calculated longitudinal-direction distances to the objects, one corresponding to a highest position with respect to the vehicle and being in front of the assistant driver's seat 3 as an indication of a longitudinal-direction position of a head of the occupant.

What is claimed is:

1. An apparatus for protecting an occupant in a vehicle having a seat, comprising:

a pair of area image sensors spaced at a predetermined interval in a transverse direction of the vehicle and located in front of the seat for taking images of an area on the seat respectively;

an occupant information calculating portion for calculating a longitudinal-direction position of a head of an occupant on the seat from the images taken by the area image sensors; and an occupant protecting portion for changing an occupant protecting operation at a time of occurrence of a collision of the vehicle in response to the longitudinal-direction position of the head of the occupant which is decided by the occupant information calculating portion;

wherein the occupant information calculating portion comprises means for dividing each of the images taken by the area image sensors into blocks;

means for calculating a cumulative difference between corresponding blocks, in each pair, of the images taken by the area image sensors each time one of the corresponding blocks is shifted in a transverse direction relative to the other on a unit by unit basis;

means for detecting when the cumulative difference minimizes for each pair of corresponding blocks, means for calculating a transverse-direction shift between the corresponding blocks, in each pair, which occurs when the cumulative difference minimizes;

means for measuring longitudinal-direction positions of objects whose images are in the blocks of the images taken by the area image sensors in response to the calculated transverse-direction shifts according to triangulation; and means for selecting, from the measured longitudinal-direction positions of the objects, one corresponding to a highest position with respect to the vehicle and being in front of the seat as the longitudinal-direction position of the head of the occupant.

2. An apparatus as recited in claim 1, wherein the occupant information calculating portion comprises means for calculating a cumulative difference between prescribed corresponding blocks in a pair during a time interval alter the area image sensors output signals representing the prescribed corresponding blocks and before the area image sensors complete outputting signals representing all the blocks.

3. An apparatus for protecting an occupant in a vehicle having a seat, comprising:

a pair of area image sensors spaced at a predetermined interval in a transverse direction of the vehicle and located in front of the seat for taken images of an area including an area of the seat respectively;

an occupant information calculating portion for calculating a longitudinal-direction position of a head of an occupant on the seat from the images taken by the area image sensors; and an occupant protecting portion for changing an occupant protecting operation at a time of occurrence of a collision of the vehicle in response to the longitudinal-direction position of the head of the occupant which is decided by the occupant information calculating portion;

wherein the occupant information calculating portion comprises:

means for dividing each of the images taken by the area image sensors into blocks;

means for calculating transverse-direction shifts between corresponding blocks of the images taken by the area image sensors;

means for sequentially implementing measurements of longitudinal-direction positions of objects whose images are in the blocks of the images taken by the area image sensors in an order from a highest-position block toward a lowest-position block in response to the calculated transverse-direction shifts according to triangulation;

means for deciding whether or not the measured longitudinal-direction position of each object is in front of the seat; and means for, when it is decided that the measured longitudinal-direction position of the object is in front of the seat deciding the measured longitudinal-direction position of the object to be the longitudinal-direction position of the head of the occupant.

\* \* \* \* \*